No. 804,575. PATENTED NOV. 14, 1905.
L. BOISARD.
CUTTING LATHE.
APPLICATION FILED MAY 6, 1904.

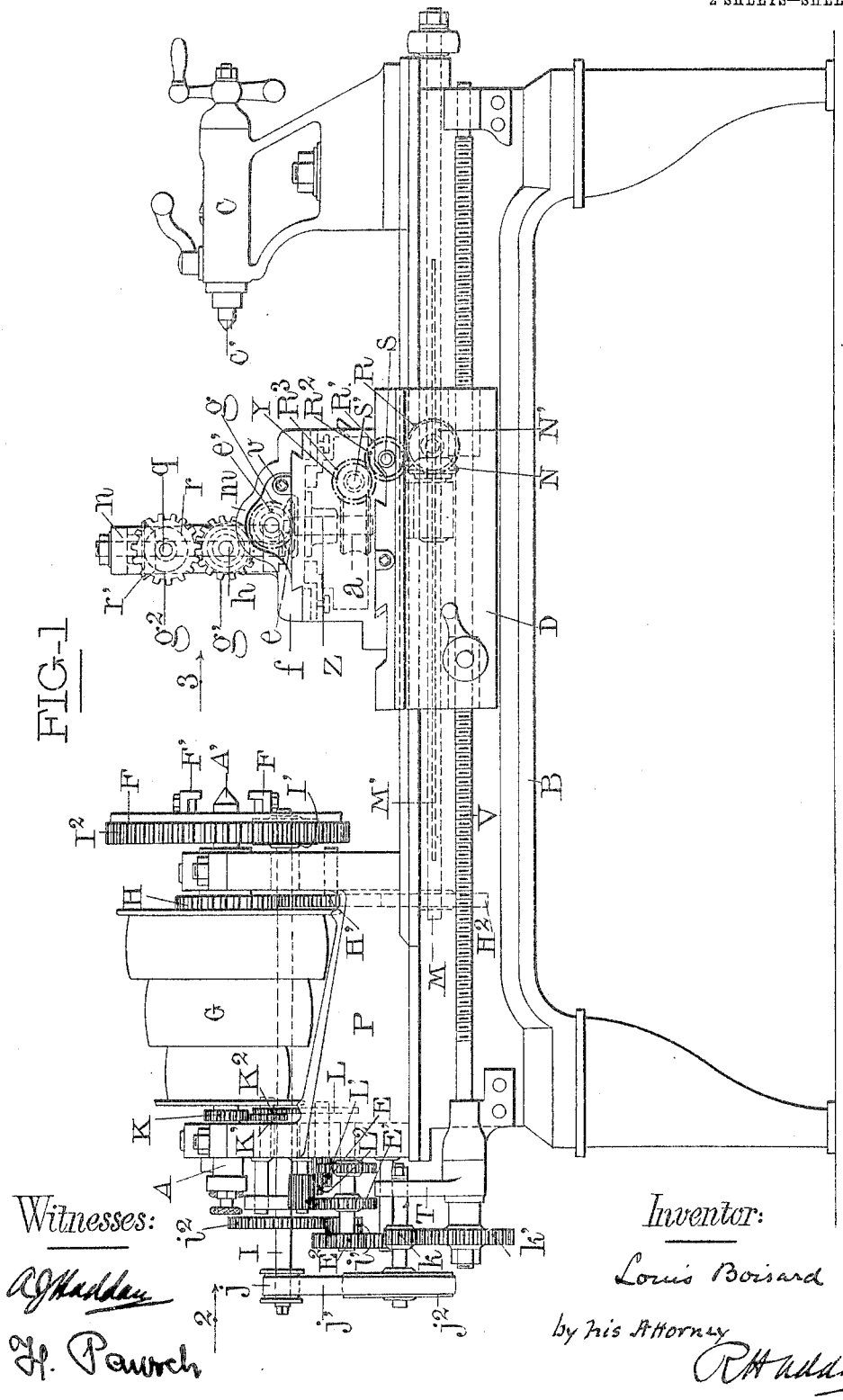

2 SHEETS—SHEET 2.

Witnesses:

Inventor
Louis Boisard
By his Attorney

UNITED STATES PATENT OFFICE.

LOUIS BOISARD, OF LYON, FRANCE.

CUTTING-LATHE.

No. 804,575.  Specification of Letters Patent.  Patented Nov. 14, 1905.

Application filed May 6, 1904. Serial No. 206,745.

*To all whom it may concern:*

Be it known that I, LOUIS BOISARD, a citizen of the French Republic, residing at Lyon, France, have invented certain new and useful Improvements in Cutting-Lathes, of which the following is a specification.

This invention relates to a combination of modifications and improvements in parallel turning-lathes for the purpose of adapting same to the cutting of gear-teeth and to various other purposes, which can be effected by the combination of the lathe with a milling-cutter carried on the slide-rest, such as the cutting of screw-threads by means of the cutter in one operation, whatever the length and pitch of the thread.

Figure 3:
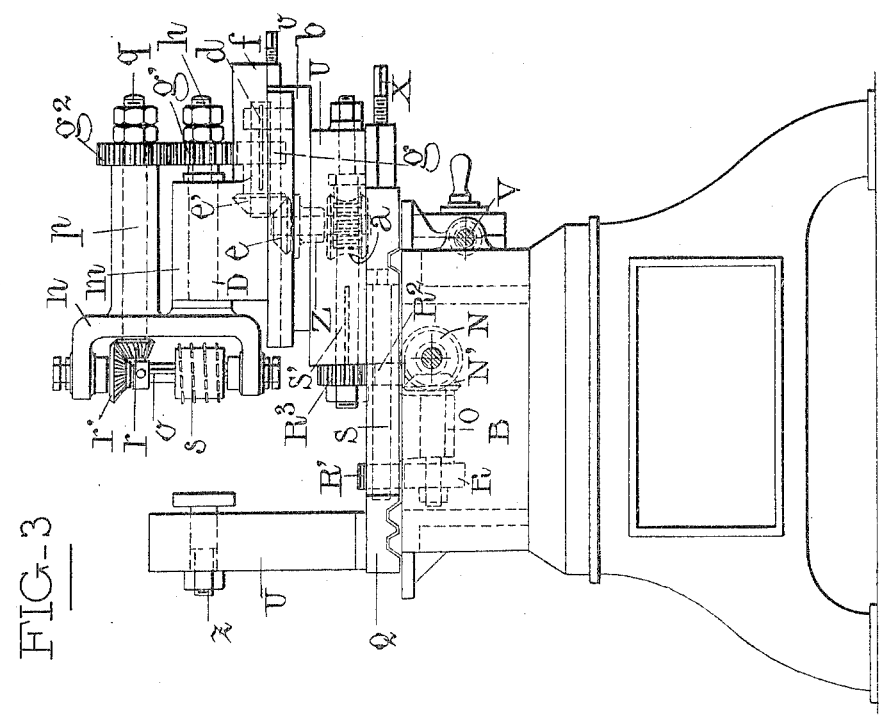
Figure 2:
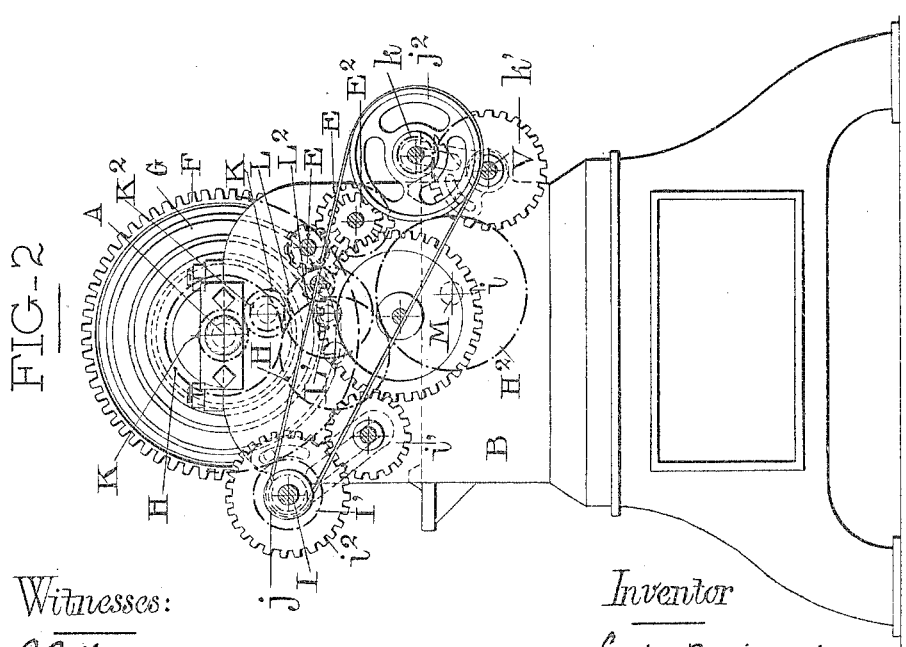

Referring to the accompanying drawings, Figure 1 is a front view of the lathe. Fig. 2 is an end elevation in the direction of the arrow 2; and Fig. 3 is a transverse section as seen from the arrow 3, the bed and its supporting-frame being shown in elevation.

The frame of the machine is similar to that of an ordinary turning-lathe with a large bed. The shaft A is horizontal and parallel to the bench B. At the left-hand end of the latter is arranged a head-stock P and at the right-hand end a tail-stock C. Between these is arranged a slide D, which forms a milling tool-holder and is movable in the space between the head and tail stocks. The slide is movable in the longitudinal direction by means of the screw V, which has at its left-hand end a bracket or arm T for supporting the change-speed gear which transmits the movement of the shaft I to the cutter. If necessary, other brackets or arms can be arranged at other points in such a manner that even very considerable changes of speed can be easily obtained. For very slow revolution of the screw V a change-speed gear is used between the shaft A and said screw V, so that, for instance, during each revolution or semirevolution of the shaft a tooth or teeth of the said gear cause the screw V to advance the slide D to the desired extent.

The head-stock P supports between two bearings the shaft A, and on this is journaled at its right-hand end a plate F in the form of a toothed wheel. The said plate F is provided with dogs F', which serve to rotate the mandrel on which the work is arranged between the points A' and C'—as, for instance, toothed wheels, printing-cylinders, screws, and the like. The pressure of the tool supported by the slide-rest is neutralized by a screw $z$, the head of which is behind the work. This screw moves in a slide U', adapted to be moved perpendicularly to the shaft A on the slide-rest.

Movement is imparted to the mechanism described by means of the step-pulley G, which is loose on the head-stock shaft A. Integral with said step-pulley are two toothed wheels H and K. The wheel H transmits its movement to the shaft M, parallel to the axis of the lathe, by means of toothed wheels H' and $H^2$. This shaft M is provided along its length with a groove M', which allows a bevel-wheel N, sliding longitudinally thereon, to receive and transmit the movement of said shaft at any point in the length thereof. This bevel-wheel N drives another wheel N', fixed to a small shaft perpendicular to the axis of the lathe, said small shaft being supported by a bearing O, fixed under the slide Q, which is a part of the slide D. The movement which the shaft O receives from the shaft M and bevel-wheels N N' thus becomes perpendicular to the shaft A and is transmitted by means of the wheels R R' to an intermediate shaft S, which, by means of the wheels $R^2$ $R^3$, drives the shaft S', passing through the part U of the slide D.

One of the wheels $R^3$ is movable along the whole length of the shaft S', which is provided with a groove for that purpose, and thus allows the part U to move along the slide Q without losing the rotary movement of the shaft S'.

The movement of the part U perpendicularly to the shaft A is obtained by means of a small nut fixed below said part U and operated by a screw X, carried by the slide Q.

The shaft S' carries at a convenient point within the part U a worm Y, which transmits its movements to the vertical shaft Z by means of a worm-wheel $a$. This mechanism allows the bracket or stock $b$, connected to the part U by means of a circular groove, to rotate completely round the shaft Z without losing the movement. The latter may be transmitted to the shaft $d$ by means of the bevel-gear $e$ $e'$. This said shaft $d$ is mounted in the bracket $b$ by means of a bearing which determines the position of the shaft with regard to the bracket.

On the bracket $b$, which has guideways, the slide $f$ is adapted to be moved by means of the screw $v$ and a nut fixed to the bracket. The shaft $d$ is provided with a groove for its whole length which allows the wheel $g$, which is held in place by a groove in slide $f$, to transmit the movement to the wheels $g'$ and $g^2$.

The wheel $g'$ is loose on a shaft $h$, which passes through the bearing $m$, cast on the slide $f$. This shaft $h$ carries at one end a forked bracket $n$, between the ends of which is mounted the cutter-holder shaft $o$. The shaft $h$ is at exactly the same height as the shaft A of the lathe. The bearing $m$ and upper part of slide $f$ are disengaged, so that the bracket $n$ can describe about the shaft $h$ an arc of approximately two hundred and twenty degrees, notwithstanding the tube $p$, cast in one with the bracket $n$ and having in its interior a shaft $q$, which receives from the wheel $g^2$ movement which it transmits to the bevel-wheels $r\ r'$ and by these to the cutter-shaft $o$. The latter is arranged so that the center of the cutter $s$ is at the same height as the centers of the shafts $h$ and A.

The shaft $o$ is carried by any suitable bearings provided with means for lubrication at the two ends of the bracket $n$.

This machine comprises three chief movements:

First. A rotary movement of the cutter $s$ round its axis. This movement is transmitted from the step-pulley G through the gears H H' H² to the shaft M and by this (whatever be the position of the tool-carrier D) to the beveled wheels N and N', then to the toothed wheels R R', to the axis S, to the toothed wheels R² R³, to the shaft S', and to its endless screw Y. The latter transmits movement to the worm-wheel $a$, shaft Z, beveled wheels $e$ and $e'$, gears $g\ g'\ g^2$, shaft $q$, beveled wheels $r$ and $r'$, and finally to the shaft $o$, to which is keyed the cutter $s$. This rotation of the cutter $s$ remains constant whatever be the position occupied by the slide D on the lathe and whatever be the inclination of the cutter on the axis $h$, inclination preadjusted in relation with the angle made by a perpendicular to the generator of the primitive cylinder of the helicoidal cutter with a tangent at the helix at the intersertion of that generator. This inclination, which is adjusted according to the thread of the tooth to be cut, remains unchanged during the cutting of all the teeth of the same pitch mounted between the points A' and C'.

Second. A movement of translation of the slide D, parallel to the axis of the lathe. This movement is transmitted from the step-pulley G to the gears K K' K² L L' L² E E' E² $i\ i'\ i^2$, to the pulley $j$, keyed to the shaft I, and from there by the belt $j'$ to the pulley $j^2$. The latter carries on its shaft a pinion $k$, which gears with the wheel $k'$, which causes the rotation of the screw V. The latter engages a fixed nut carried by the slide D and causes the advancement of the latter parallel to the axis of the lathe at an excessively slow rate.

Third. A rotary movement of the cylinder or blank to be cut carried between the points A' and C' and by the face-plate F by means of the dogs F' F'. This movement is transmitted by the shaft I to the pinion I' and from there to the wheel I², which is integral with the face-plate F.

The lathe can be used for various kinds of work with equal facility, viz:

First, for the cutting of toothed wheels by an ordinary cylindrical cutter. In this case it is sufficient for straight teeth to apply to the plate F a divided plate or any suitable system of division for revolving the wheel to be cut as required by the different stages of the operation. In this case the movement transmitted by the wheel K and its gear-train is not employed.

Secondly, for cutting gear-wheels with helicoidal teeth the operation is the same as before, with the addition that between each tooth the movement transmitted by the wheel K intervenes, which revolves the plate F.

Thirdly, for the helicoidal cutting of cylinders for mills, printing, and the like, and also for the straight cutting of said cylinders only the shape of the cut distinguishes the latter operations from the two former.

Fourthly, for the straight cutting of gear-wheels or screws by a helicoidal cutter. For this purpose it is sufficient to combine the movements of pulley G between shaft A on one hand and the shaft $o$ on the other hand, so that the number of revolutions of the shafts A and $o$ is in the ratio of one to the number of divisions to be obtained on the toothed wheel or other piece of work.

I declare that what I claim is—

In a lathe the combination of a bed, head and tail stocks thereon, driving-gear in the head-stock, face-plate thereto, speed-change gear between driving-gear and face-plate, a tool-holder adapted for longitudinal and transverse movement on the bed and comprising parts rotarily adjustable in horizontal and vertical planes with respect to one another, a feed-screw journaled in the bed controlling the longitudinal movement of the tool-holder, speed-change gear between driving-gear and feed-screw, a longitudinal shaft journaled in the bed, speed-change gear between the driving-gear and longitudinal shaft, a gear-wheel in said tool-holder coöperating with and shiftable longitudinally on said longitudinal shaft, a train of gear in said tool-holder disposed to coöperate with said gear-wheel irrespective of positions of adjustment and movements of the tool-holder, and a helicoidal cutter in said tool-holder adapted to be revolved by said train of gear.

In witness whereof I have signed this specification in the presence of two witnesses.

LOUIS BOISARD.

Witnesses:
   Marin Vachon,
   Guillaume Pioche.